Nov. 11, 1952        D. E. CRAGGS        2,617,941
MEASUREMENT OF FLUID FLOW IN BOREHOLES BY RADIOACTIVITY
Filed Feb. 17, 1950
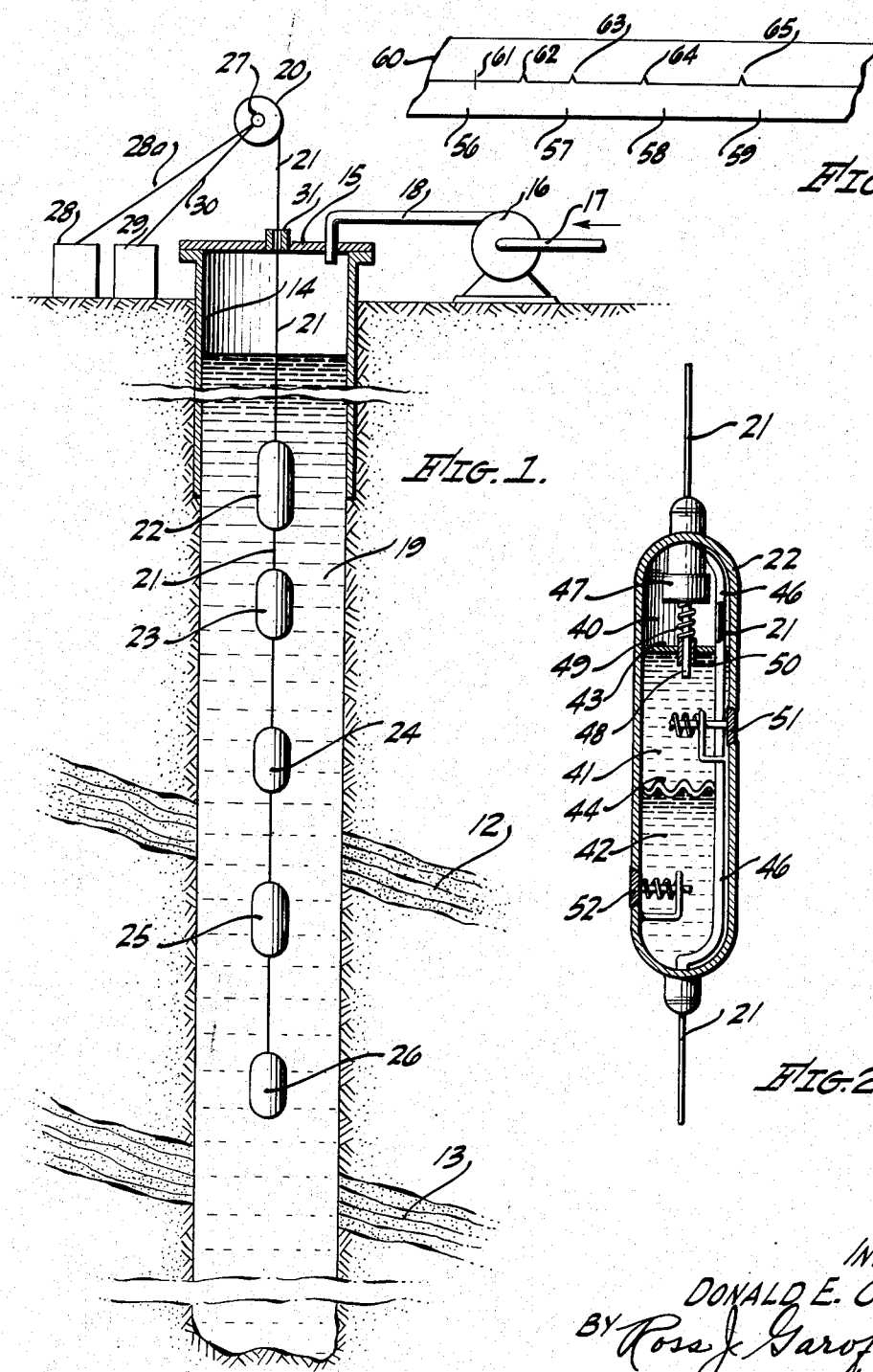
INVENTOR.
DONALD E. CRAGGS,
BY Ross J. Garofalo
ATTORNEY.

Patented Nov. 11, 1952

2,617,941

UNITED STATES PATENT OFFICE 2,617,941

MEASUREMENT OF FLUID FLOW IN BOREHOLES BY RADIOACTIVITY

Donald E. Craggs, Whittier, Calif., assignor to Union Oil Company of California, Los Angeles, Calif., a corporation of California Application February 17, 1950, Serial No. 144,642

3 Claims. (Cl. 250—43.5)

This invention relates generally to a method and apparatus for measuring fluid flow. More particularly, this invention relates to a method and apparatus for measuring the flow of fluids such as oil or water in an oil well bore.

The use of secondary recovery measures, such as water flooding, is of widespread application at the present time. In order to exploit such recovery methods to the utmost, it is desirable to determine the relative water injection rate into each of the earth formation layers. In other cases such as where oil is being produced from several formations, it is desirable to know the amount of the oil production from each strata or from each of several sections of the strata. These problems are solved by the use of a well bore flowmeter and this invention is directed to a particular type of well bore flowmeter suitable for these and other uses.

It is an object of this invention to determine the fluid velocity of a fluid flowing in a well bore by detecting the radiation of a minor amount of a radioactive tracer liquid transported by the flowing fluid.

It is another object of this invention to determine the fluid flow rate in a well bore by following the transport of a minor amount of a radioactive tracer compound which is carried by the fluid flow.

It is another object of this invention to inject a minor amount of a tracer liquid containing a radioactive constituent into a flowing fluid whose flow rate is to be determined, thereby establishing a discontinuity of radiation in the flowing stream and to plot the flow of such tracer liquid during its transport by the main body of the flowing fluid whereby the velocity of the latter fluid can be determined.

It is another object of this invention to inject periodically small increments of a radioactive fluid into a flowing stream and to measure the rate of fluid flow by continuously measuring the radioactivity of the moving fluid at two or more points downstreamwardly and along the direction of flow and relating the time interval between the detection of corresponding discontinuities of radioactivity at the several points to the rate of flow of such fluid.

It is another object of the invention to provide an apparatus for determining fluid flow within a bore hole wherein a tracer increment is injected into the flowing stream by an injecting means and such increment is detected downstreamwardly by one or more radiation detecting means, with a suitable timing means being provided for determining the lapsed time interval either between the injecting means and a radiation detecting means or between two radiation detecting means.

Briefly, this invention relates to a new method for the determination of fluid flow rates within a well bore wherein the velocity of the flowing stream is measured by estimating the rate of movement of small increments of radioactive liquid suspended in and moving with the fluid stream being measured. For this purpose small amounts of a tracer liquid bearing a radioactive component are injected into the flowing stream either singularly or at periodic intervals and the arrival of the radioactively tagged increment is noted by the fluctuation in the radiation at the particular point as the increment flows past. In the preferred modification two or more Geiger-Müller counters or other suitable radiation detectors are located downstreamwardly from the tracer injector, each counter being separated from each of the others by known distances, and the time at which each detector registers a particular discontinuity is recorded on a time marked record or time strip. The time difference between any two counters and the distance therebetween gives the fluid velocity from which the flow rate can be calculated. In another modification of the invention the time of the injection can also be used as a point of reference which, together with one or more radiation detectors located downstreamwardly at known distances therefrom, can be used to time the flow of the increment over the distances from the tracer liquid injector. By employing any of the aforementioned combinations to determine the fluid flow at a number of different levels in the bore hole, the ingress or egress of fluids into or from the bore hole can be located and determined from the corresponding increase or decrease of fluid flow.

Attached Figure 1 presents one modification of the invention for simultaneously determining the fluid flow within a bore hole and the differential egress of fluid from the bore hole into a particular formation by means of a series of four Geiger-Müller counters, wherein such bore hole is being employed as an injection well in a water flooding operation.

Attached Figure 2 shows a tracer injecting device for injecting small quantities of a radioactive tracer fluid into the flowing stream at regular or irregular time intervals, as desired.

Attached Figure 3 shows a typical time strip record indicating time intervals between the detection of radiation at several different points in the bore hole.

Referring now more particularly to attached Figure 1, bore hole 11 is completed through various miscellaneous earth formations including an upper permeable formation 12 and a lower permeable formation 13. The upper section of bore hole 11 is cased with well casing 14 which is in turn fitted with well cover 15. At the earth surface centrifugal pump 16 takes suction through line 17 on an injection water supply not shown. Centrifugal pump 16 discharges water through discharge line 18 through cover 15 and into the well bore 11. Injection water stands in column 19 within bore hole 11 and as a result of the hydrostatic pressure on the hydraulic pressure created by pump 16 or both, water gradually seeps into both the upper and the lower permeable earth formations 12 and 13 respectively which surround bore hole 11. Supporting cable 21 is partly wound on and is thereby supported by winding drum 20. Supporting cable 21 passes downwardly through a suitable closure 31 in cover 15 and thence downwardly through the column of water 18 standing in bore hole 11. Supporting cable 21 first supports and also passes through tracer injecting device 22 and thereafter and in a consecutive manner passes through and supports a first Geiger-Müller counter 23, a second Geiger-Müller counter 24, a third Geiger-Müller counter 25 and a fourth Geiger-Müller counter 26, respectively. The first and second Geiger-Müller counters, 23 and 24 respectively, are suspended above upper permeable formation 12 while the third and fourth Geiger-Müller counters 25 and 26 respectively are suspended between upper permeable formation 12 and lower permeable formation 13. Supporting cable 21 is equipped with suitable insulated electric wiring for conveying electrical energy to the earth surface from each of the four Geiger-Müller counters 23, 24, 25 and 26 respectively, and also for transmitting electrical energy from the earth surface to tracer injecting device 22. At the earth surface winding drum 20 is fitted with suitable commutators 27 for electrically connecting time and radiation recorder 28 through leads 28a to the first, second, third and fourth Geiger-Müller counters, 23, 24, 25 and 26 respectively, and also for electrically connecting actuator 29 through leads 30 to tracer injecting device 22. Time and radiation recorder 28 is adapted to record the time intervals between an injection of tracer liquid and the subsequent detection of the tracer liquid by each of the several Geiger-Müller counters.

Referring now more particularly to attached Figure 2 showing a cross sectional view of the tracer injecting device 22, this device comprises three separate sections, namely, a sealed upper section 40, a liquid intake middle section 41, and a tracer injector lower section 42. Upper section 40 is separated from middle section 41 by rigid partition 43. Middle section 41 is separated from lower section 42 by a flexible and stretchable partition 44. Tracer injecting device 22 is supported by a suitable coupling to supporting cable 21. Supporting cable 21 passes through the tracer injecting device 22 within the enclosing protective pipe 46.

The sealed upper section 40 contains a solenoid 47 for periodically moving plunger 48 downwardly against the compressional force of attached spring 49. The periodic movement of solenoid 47 is effected at either regular or irregular time intervals, as desired, by means of current supplied by actuator 29 which flows through leads 30, commutators 27 and the insulated electrical connections in supporting cable 21. Actuator 29 is any suitable electro-mechanical or electrical device for supplying bursts of electrical energy at either regular or irregular intervals.

The lower end of plunger 48 extends through packing gland 50 into the middle section 41. Middle section 41 is fitted with inwardly acting check valve 51 which communicates between the middle section 41 and the bore hole fluid external to and surrounding the tracer injecting device 22. The downward movement of plunger 48 causes check valve 51 to close and remain closed, while the upward movement of plunger 48 causes check valve 51 to open and admit a small amount of bore hole fluid to the middle chamber 41 which amount corresponds approximately to the difference between the displacement of the plunger in the two positions.

The lower section 42 is filled with a tracer liquid containing a dissolved radioactive chemical and the lower section 42 is also fitted with an outwardly acting check valve 52 for discharging the radioactive liquid into the bore hole fluid. The downward action of plunger 48 creates a hydraulic pressure in the middle section which is transmitted through the flexible partition 44 to the liquid medium of lower section 42 and thence to check valve 52. As a result of the hydraulic pressure check valve 52 opens and discharges a small amount of the radioactive tracer liquid into the bore hole fluid. The upward movement of plunger 48 under the action of spring 49 following the de-energizing of solenoid 47 causes check valve 52 to close and causes check valve 51 to open momentarily to admit an equivalent volume of bore hole fluid into the middle section to replace volumetrically the amount discharged from the lower section. As the lower section 42 is progressively emptied, flexible partition 44 is gradually stretched downwardly to fill the void space and with each resulting expansion of the middle section 41 additional bore hole fluid is admitted to fill the expanded space.

In the operation of the equipment, tracer injecting device 22 singularly or periodically injects a small amount of liquid containing a dissolved radioactive compound into the surrounding bore hole fluid which fluid is flowing downwardly through the bore hole. The motion of the flowing stream carries the tagged increment downstreamwardly past the first Geiger-Müller counter 23 which detects the arrival of the tagged increment and transmits a corresponding electric signal upwardly through conducting cable 21, commutators 27, and leads 28a to time and radiation recorder 28. Thereafter the downward motion of the fluid transports the tagged increment downstreamwardly past second Geiger-Müller counter 24, which in the manner similar to that previously described for first Geiger-Müller counter 23 transmits a corresponding electric signal to time and radiation recorder 28. The motion of the fluid thereafter carries the tagged increment downstreamwardly past permeable formation 12 which formation continuously withdraws a portion of the fluid stream and decreases the velocity of the stream accordingly. The tagged increment, or a portion thereof, is thereafter transported past third and fourth Geiger-Müller counters, 25 and 26 respectively, each of which transmits a corresponding signal to time and radiation recorder 28.

Referring now more particularly to attached Figure 3, time strip 60 represents a portion of the record which is obtained from the time and radiation recorder 28. Time strip 60 has been marked by a suitable timer at periodic intervals such as at the end of each second, minute, five minute period, etc. Time marks on time strip 60 are represented by marks 56, 57, 58 and 59 respectively. Whenever current flow from actuator 29 for the discharge of tracer liquid from tracer injecting device 22, a mark indicating such time is recorded on time strip 60, one such time mark being indicated by mark 61. Where there is a significant time lag between the impulse of the electric current and the time at which the tracer liquid becomes effectively transported in the flowing fluid, mark 61 may be made after a suitable time delay, such time delay being effected by a suitable mechanical or electro-mechanical device.

As the radioactive tracer liquid flows downstreamwardly and passes each of the four Geiger-Müller counters successively, there is a corresponding increase and decrease in the signal of each of the four counters respectively. In Figure 3 the increase of radiation of first Geiger-Müller counter 22 is marked by peak 62 while the corresponding effect on second, third and fourth Geiger-Müller counters 23, 24, and 25 respectively, is indicated by corresponding peaks 63, 64 and 65 respectively. The time interval between injection time mark 61 and any of the radiation peak marks 62, 63, and 64 or 65 respectively, or between any of the radiation peak marks themselves, is determined by reference to the time scale marks 56, 57, 58 and 59.

The calculation of the flow rates in the well bore is made as follows:

Let
$d_1$ = average distance between check valve 52 of tracer injecting device 22 and detecting section of first Geiger-Müller counter 23;
$d_2$ = the average distance between the detecting sections of first and second Geiger-Müller counters 23 and 24 respectively;
$d_3$ = the average distance between the detecting sections of second and third Geiger-Müller counters 24 and 25 respectively;
$d_4$ = the average distance between the detecting sections of third and fourth Geiger-Müller counters 25 and 26 respectively;
$t_{61}$ = time of tracer injection (mark 61).
$t_{62}$ = time of detection of radiation by first Geiger-Müller counter (mark 62);
$t_{63}$ = time of detection of radiation by second Geiger-Müller counter (mark 63);
$t_{64}$ = time of detection of radiation by third Geiger-Müller counter (mark 64);
$t_{65}$ = time of detection of radiation by fourth Geiger-Müller counter (mark 65);
$A_1$, $A_2$, $A_3$ and $A_4$ be the average cross sectional area of the bore hole over the respective distance intervals $d_1$, $d_2$, $d_3$ and $d_4$.

Then $$V_1 = \frac{d_1}{t_{62}-t_{61}}; \quad F_1 = A_1 V_1$$

$$V_2 = \frac{d_2}{t_{63}-t_{62}}; \quad F_2 = A_2 V_2$$

$$V_3 = \frac{d_3}{t_{64}-t_{63}}; \quad F_3 = A_3 V_3$$

$$V_4 = \frac{d_4}{t_{65}-t_{64}}; \quad F_4 = A_4 V_4$$

Where $V_1$, $V_2$, $V_3$ and $V_4$ are the average fluid velocities over the corresponding intervals $d_1$, $d_2$, $d_3$ and $d_4$ respectively and $F_1$, $F_2$, $F_3$ and $F_4$ are the corresponding average fluid flow rates over these same intervals.

In the usual case where the volume occupied by the instruments is small compared to the bore hole volume between the instruments, the effective average bore hole diameter is the numerical average of the diameter throughout the distance interval. Furthermore, since the bore hole is often of uniform diameter as is the present case, then $$A_1 = A_2 = A_3 = A_4$$

Also the equipment is usually so arranged that $$d_1 = d_2 = d_3 = d_4$$

Hence $$F_1:F_2:F_3:F_4 = \Delta t_1 : \Delta t_2 : \Delta t_3 : \Delta t_4$$

Where $$\Delta t_1 = t_{62} - t_{61}$$
$$\Delta t_2 = t_{63} - t_{62}$$
$$\Delta t_3 = t_{64} - t_{63}$$
$$\Delta t_4 = t_{65} - t_{64}$$

In the particular case shown in Figure 1, it is found that $F_1$ and $F_2$ are substantially equal since there is no withdrawal of bore hole fluid between tracer injecting device and first Geiger-Müller counter 23 or between first and second Geiger-Müller counters 23 and 24 respectively. $F_3$ will be less than $F_2$ since there is a partial withdrawal of bore hole fluid by upper permeable formation 12. Since there is no withdrawal of bore hole fluid between third and fourth Geiger-Müller counters, 25 and 26 respectively, $F_4$ is the true flow rate therebetween.

It is apparent that $F_1 = F_2$ = total injection flow rate;
$F_2 - F_4$ = injection flow rate into formation 12;
$F_4$ = injection flow rate into formation 13.

In the usual case the relative positions of the permeable formations is not known. Therefore in the general case, a liquid injection device and one or more radiation detectors, separated therefrom and/or from each other by a known distance, are lowered into the bore hole and are positioned at a series of points throughout the bore hole and the fluid velocity is measured at each of the points of the series. Where the velocity is uniform over two successive distance intervals generally no egress or ingress is taking place in either distance interval. Where, however, the velocity over two intervals differ, there is an ingress or egress in one of the two intervals and examination of other nearby intervals will determine which is the case and what are the flow rates. A plot of the fluid velocity in the bore hole versus depth will reveal the location of the permeable formations and the amount of fluid that each is withdrawing from the bore hole.

Where the problem is one of measuring oil flow in a well bore, the tracer injecting device is normally placed below the one or more radiation detectors. The tracer injecting device must of course be located in a zone of some net upward flow in order for the tracer to be transported. The measurements are made in substantially the same way as has been described before with the exception that the velocity of the tagged increment increases as each formation adds its contribution of oil to the bore hole flow.

The tracer liquids employed in this invention will generally consist of a carrier liquid and a radioactive compound. It is preferable that the radioactive compound be a gamma ray emitter in order that the detection thereof may be simplified. It is preferable that the carrier liquid be miscible with the fluid whose flow is being measured. Thus where water fluid is being measured it is preferable to use aqueous dispersions of radioactive compounds; and to use hydrocarbon oil dispersions of radioactive compounds where oil flow is being measured. Where the tracer liquid is not miscible with the fluid flow, a buoyancy or submergence of the tracer fluid normally occurs during the flow between two radiation detectors with the result that the transport time therebetween is not a true measure of the fluid velocity. A connected fluid velocity can be calculated for this situation by the application of Stokes' law however.

It is preferable that the radioactive compound be soluble in the carrier liquid since various separation problems and resulting inaccuracies may be eliminated thereby. For the case where water flow is to be measured it is preferable to employ inorganic water-soluble salts which are radioactive. In such cases it is desirable to include a larger amount of an inert salt of the same or relatively similar chemical constitution to minimize and/or prevent the selective removal of the trace of radioactive salt from solution by any physical or chemical process, e. g., ion exchange.

Water-soluble radioactive salts of any of the following radio-elements may be employed for the purpose of this invention: iodine$^{131}$, bromine$^{82}$, selenium$^{75}$, cobalt$^{60}$, gallium$^{72}$, lanthanum$^{140}$, molybdenum$^{99}$, osmium$^{191}$, potassium$^{42}$, praseodymium$^{142}$, sodium$^{24}$, wolfram$^{187}$, zinc$^{65}$ and zinc$^{69}$. Radio-iodine and radio-bromine are most easily employed in the form of iodides or bromides of ammonium or alkali metals. Others of the foregoing radio-elements may be employed as nitrates, chlorides, acetates, sulfates, bromates, etc. The foregoing group of radio-elements are especially desirable from the standpoint of convenient half-life, gamma-ray emission, and availability. However, it is apparent that other radio-elements may be similarly employed as their water-soluble salts.

In order to prevent removal of the radio-active constituent from solution various inert salts are used to dilute the chemical and physical effects of the radio-elements. Thus inactive potassium bromide may be employed with either KBr$^{82}$ or K$^{42}$Br; inert sodium iodide may be employed with either NaI$^{131}$ or Na$^{24}$I; inactive cerous chloride CeCl$_3$ may be employed to dilute the chemically similar Pr$^{142}$Cl$_3$ or La$^{140}$Cl$_3$; and inactive zinc acetate may be employed to dilute the effect of Zn$^{65}$(C$_2$H$_3$O$_2$)$_2$ or Zn$^{69}$(C$_2$H$_3$O$_2$)$_2$.

In the case where oil flow is to be measured the carrier liquid is preferably a hydrocarbon oil and the radio-active compound is preferably an oil-soluble compound. A larger amount of an inert compound of the same or similar chemical structure is usually employed along with the radio-active compound in order to prevent the selective removal of the latter. Suitable radio-active compounds may be, for example, bromo- or iodo- hydrocarbons prepared from Br$^{82}$ or I$^{131}$. Carboxylic acid and sulfonic acid soaps prepared from any of the radio-elements described hereinbefore may be employed. Organic selenium compounds, such as seleno-ethers and seleno-alcohols, prepared from selenium$^{75}$ may be employed. Likewise various organo-metallic derivatives of the various radio-active metals described hereinbefore may be employed.

Although the preferred method for injecting the tracer liquid is by the means shown in Figure 2, it is apparent that other similar devices may be employed. A solenoid valve fitted to a reservoir containing a radioactive liquid under pressure can be periodically actuated to release a small amount of liquid therefrom at intervals. In other modifications purely mechanical devices operated through spring released valves actuated by clocks may be employed.

In one modification of the invention the tracer injecting device is replaced with a neutron emitting device which is employed periodically to form a radioactive, gamma ray emitting increment in the flowing fluid. A neutron emitter may be prepared by mixing a radium salt, e. g., radium nitrate, with metallic beryllium powder. A shield of heavy water, paraffin wax, etc., normally employed to stop the neutrons, is periodically removed and the neutrons are permitted to fall upon the flowing stream for a brief interval of time thereby forming a radiological discontinuity.

It is apparent that the broad application of this invention consists in creating a radiological discontinuity in a fluid flowing in a well bore, such as by periodically injecting a small increment of a radioactive substance into such fluid, and following the velocity of such radiological discontinuity by means of one or more radiation detectors located downstreamwardly from the means creating the radiological discontinuity.

It is apparent that many modifications of this invention may be made by those skilled in the art without departing from the spirit and scope of the following claims.

I claim.

1. An apparatus for injecting small constant amounts of a liquid at intervals into a flowing liquid stream within a bore hole which apparatus comprises a rigid housing insertable into said bore hole, a flexible stretchable partition, said flexible stretchable partition dividing the interior of said housing into a liquid intake chamber and a liquid discharge chamber, a first check valve fitted in said housing communicating between the exterior and said intake chamber, a second check valve fitted in said housing and communicating with the exterior and said discharge chamber, a reciprocating piston fitted in said intake chamber for changing the displacement of said chamber a constant amount at intervals so as to cause a discharge of tracer fluid from said discharge chamber through said second check valve on the extension stroke of said piston, and the intake of a similar volume of said bore hole liquid through said first check valve on the retraction stroke of said piston.

2. An apparatus for injecting small constant amounts of a liquid at intervals into a flowing liquid stream, which apparatus comprises a rigid impervious housing, the interior of said housing being divided into upper, middle and lower chambers by a rigid partition adjacent the upper end thereof and a stretchable flexible partition axially spaced from said rigid partition toward the lower end of said housing, a reciprocating piston operated by a mechanical reciprocating means entirely housed within said upper chamber, said piston extending through a liquid-tight seal in said rigid partition and terminating in said middle chamber, a fluid actuated inlet check valve fitted in the housing of said middle chamber and communicating with the exterior, and a fluid actuated outlet check valve fitted in the housing of said lower chamber and communicating with the exterior.

3. An apparatus for measuring the flow rate of a flowing fluid within a well bore which comprises a tracer injecting device for periodically injecting small predetermined constant amounts of a tracer fluid, said tracer injecting device comprising a liquid intake chamber and a liquid discharge chamber, a flexible stretchable partition separating said intake chamber and said discharge chamber, a fluid actuated inlet check valve fitted to said intake chamber and communicating with the fluid surrounding said tracer injecting device, a fluid actuated outlet check valve fitted to said discharge chamber and communicating with the fluid surrounding said tracer injecting device, a reciprocating piston extending into said intake chamber and adapted to periodically change the displacement of said intake chamber a constant amount thereby causing the periodic discharge of a small constant quantity of said tracer fluid through said outlet check valve on the extension stroke of said piston, and the intake of a similar volume of said well bore fluid through said inlet check valve on the retraction stroke of said piston, a radiation detector, means for suspending said radiation detector a known distance downstreamwardly from said outlet check valve and timing means for continuously measuring the time interval between said discharging of said tracer and the detection of said tracer by said radiation detector.

DONALD E. CRAGGS.

REFERENCES CITED

The following references are of record in the file of this patent:

UNITED STATES PATENTS

| Number | Name | Date |
| --- | --- | --- |
| 1,471,091 | Bessesen | Oct. 16, 1923 |
| 1,854,458 | De Quincy et al. | Apr. 19, 1932 |
| 2,385,378 | Piety | Sept. 25, 1945 |
| 2,446,588 | Herzog et al. | Aug. 10, 1948 |
| 2,453,456 | Piety | Nov. 9, 1948 |